Patented Oct. 24, 1939

2,177,418

UNITED STATES PATENT OFFICE 2,177,418

COATING COMPOSITION COMPRISING A SOLUBLE CELLULOSE COMPOUND AND A PROTECTIVE AGENT

Carleton Ellis, Montclair, N. J., assignor to Ellis-Foster Company, a corporation of New Jersey No Drawing. Application October 18, 1926, Serial No. 142,532. Renewed January 9, 1937

8 Claims. (Cl. 260—16)

This invention relates to a coating composition containing a soluble cellulose derivative and a protective agent and to films made therefrom. The soluble cellulose derivative embraces cellulose esters such as cellulose acetate and nitrate, methyl or ethyl ethers or other compound of cellulose soluble in appropriate organic solvents and capable of forming films on drying. The protective agent or compound is one which is compatible with the aforesaid cellulose body and which yields with said body an enduring film on drying from a solution in which both constituents are dissolved. Specifically the protective compound is a resinous or semi-resinous body as will be more fully hereinafter described, such bodies being incorporated in a vehicle of a volatile character, whereby, when the coating composition is applied to a surface of wood, metal, concrete, and the like, a tough, durable coating results on the evaporation of said vehicle.

The invention will be described particularly from the standpoint of nitrocellulose, pyroxylin, or other soluble cotton, especially the type known as low viscosity nitrocellulose, which embraces the preferred embodiment hereof, but the employment of other esters such as the acetate or propionate of various ethers of cellulose, and the like, is not precluded.

*Low viscosity nitrocellulose.*—Low viscosity nitrocellulose as described in my co-pending applications may be prepared by the treatment of ordinary high viscosity nitrocellulose in solution, with an alkali or alkaline substance such as ammonia. The low viscosity nitrocellulose also may be made by subjecting high viscosity nitrocellulose to heat treatment at a temperature of say 120–130° C. In some cases also it is possible to pretreat the linters or other form of cellulose employed for nitration whereby the low viscosity nitrocellulose results. This type of nitrocellulose differs somewhat from normal nitrocellulose owing to the chemical changes which have been brought about in its manufacture. It is less resistant to the action of the weather and sunlight and this more ready tendency to such action increases in a general way as the viscosity of the nitrocellulose is reduced. In order to prepare lacquers containing the maximum amount of nitrocellulose consistent with ease of application as a coating composition the low viscosity product is desired. On the other hand reduction in viscosity beyond a certain point yields so perishable a coating that it becomes useless for exterior application, although such nitrocellulose of extremely low viscosity would be of special value in coating compositions if it were less perishable. In the present invention there is disclosed a method whereby nitrocellulose of abnormally low viscosity, a viscosity hitherto not utilized, may be employed advantageously in coating compositions.

*Adhesion.*—To possess broad utility as a coating composition employed in substitution for ordinary oil paints and varnishes, a pyroxylin solution should have adhesive qualities, which nitrocellulose by itself lacks. If a coating of pure nitrocellulose is applied to a smooth surface it is not difficult to strip a good bit of that coating in the form of pieces of large area. In a lacquer employed for painting sheet steel and other smooth surfaces this stripping effect is not desirable and adhesion to the surface to be coated is desired without having the exterior of the coating sticky or tacky. It is preferred that the effect of a blow or wrench cause merely local chipping or flaking rather than starting a point of rupture where stripping in large sheets would occur. At the present time various natural resins such as damar, sandarac, manila, copal, rosin, and sometimes shellac, are used to produce adhesion.

*Thickness of coating.*—The addition of these resins also assists in meeting another requirement, namely; that of increasing the total solids, so that a thick film results on application. It is important to build up a smooth substantial film or layer to give smoothness and richness of finish while using as few coats as possible.

There is a very definite and comparatively low limit to the proportion of nitrocellulose which can be introduced due to its viscosity. The addition of these resins does not increase the viscosity greatly, therefore, a considerable proportion thereof could be added were it not for certain disadvantages which these resins possess. The manufacturer of coating compositions of the lacquer type desires to use a large proportion of resin in order to increase the total solids, but finds that these resins are generally rather perishable of themselves and when used with nitrocellulose do not add to its life, but rather decrease it. This is especially the case when the tests are conducted by outside exposure, the coating containing such resins, *ceteris paribus*, usually being found to perish quicker than the nitrocellulose alone and the tendency to destruction by the elements increasing roughly in proportion to the amount of these natural resins present.

The manufacturer of lacquers for exterior exposure, therefore, is in a dilemma. He requires resin for adhesion and layer building, but he decreases the life of the essential component, nitrocellulose, by adding so destructive a component as natural resin.

*Protective resins.*—In accordance with the present invention protective synthetic resins are employed instead of destructive natural resins. The life of the nitrocellulose coating thereby is protracted instead of being shortened. These synthetic resins or resinates are prepared from various reagents which yield appropriate resinous products. For illustrative purposes some of these, with the manner of preparation are given below: Proportions are parts by weight.

(A) Linseed phthalic glyceride resin

|  | Parts by weight |
|---|---|
| Glycerol | 94 |
| Phthalic anhydride | 160 |
| Fatty acids of linseed oil | 80 |

Heated to 250° C. for about 2 hours. Light brown resin, acid number 20.2, compatible with nitrocellulose and soluble in butyl acetate.

(B) Cottonseed phthalic glyceride resin

|  | Parts by weight |
|---|---|
| Glycerol | 94 |
| Phthalic anhydride | 160 |
| Fatty acids of cottonseed oil | 80 |

Heated to 240° C. about 4 hours. Light brown resin, acid number 22.4, compatible with nitrocellulose and soluble in butyl acetate.

(C) Blown rapeseed phthalic glyceride resin

|  | Parts by Weight |
|---|---|
| Glycerol | 94 |
| Phthalic anhydride | 160 |
| Fatty acids of blown rapeseed oil | 80 |

Heated to 260° C. for 2 hours. Dark brown tough resin, acid number 20.6, blends well with nitrocellulose.

(D) Soya bean phthalic glyceride resin

|  | Parts by Weight |
|---|---|
| Glycerol | 94 |
| Phthalic anhydride | 160 |
| Fatty acids of soya bean oil | 80 |

Heated for 1½ hours to maximum temperature of 265° C. Brown, transparent resin, melting point 71° C., acid number 17.2. Soluble in butyl acetate and blends well with nitrocellulose.

(E) Benzoic phthalic glyceride

|  | Parts by Weight |
|---|---|
| Benzoic acid | 98 |
| Phthalic anhydride | 118 |
| Glycerol | 94 |

Heated to 230° C. within ½ hour. A vacuum of 28 inches was then applied and the temperature slowly raised to 290° C. Product is a pale slightly tacky resin of acid number 16.6, soluble in ethyl and butyl acetates and compatible with nitrocellulose.

(F) Benzoic nitro-benzoic phthalic glyceride resin

|  | Parts by Weight |
|---|---|
| Glycerol | 94 |
| Phthalic anhydride | 118 |
| Benzoic acid containing about 10 per cent p-nitro-benzoic acid | 98 |

Heated to 280° C. in 2 hours. Dark colored resin, acid number 18.8.

(G) Castor oil phthalic glycol resin

|  | Parts by Weight |
|---|---|
| Mixture of about equal parts ethylene and propylene glycols | 104 |
| Phthalic anhydride | 160 |
| Castor oil | 80 |

Heated to 240° C. in 1½ hours. Pale, soft, sticky resin, acid number 15.3. Soluble in butyl acetate and compatible with nitrocellulose.

(H) Castor oil phthalic glyceride resin

|  | Parts by Weight |
|---|---|
| Glycerol | 94 |
| Phthalic anhydride | 160 |
| Castor oil | 80 |

Heated to about 235° C. gave pale resin, acid number 12, soluble in butyl acetate and compatible with nitrocellulose. This resin differs in several respects from those resins described above made with the acid of the free fatty acids of vegetable oils (viz. A, B, C & D).

During the course of reaction in the formation of these resins, water vapor is given off, as set forth for example in my application, Serial No. 61,839, filed October 10, 1925, and after the period of time set out for complete reaction, evolution of water vapor ceases.

*Coating compositions.*—A nitrocellulose of low viscosity (½ second) was dissolved in a solvent vehicle to make a 25% solution (25% by weight of nitrocellulose). The solvent vehicle was composed of n-butyl propionate 15%, n-butyl acetate 25%, n-butyl alcohol 15%, toluol 35% and monochlorobenzol 10%, by weight. Solutions of the above resins were made in solvent vehicle of like composition, using equal parts by weight of resin and vehicle. A plasticizer was employed consisting of blown castor oil 50%, dibutyl phthalate 25% and tricresyl phosphate 25%. The final coating composition consisted of—

|  | Parts by Weight |
|---|---|
| Nitrocellulose solution | 40 |
| Resin solution | 40 |
| Plasticizer | 5 |
| Additional solvent vehicle | 24 |

(Note, no plasticizer was used in the castor oil phthalic glycol resin composition due to the softness of the resin itself.)

In some tests which were carried out these compositions were applied as a single coat to metal sheets and were exposed on the roof of a building throughout a summer season.

As dammar is the natural resin customarily employed in lacquers a similar composition was prepared with dammar in lieu of the synthetic resin and exposed under like conditions. A blank (nitrocellulose and plasticizer without any resin) was exposed simultaneously.

The results of these tests are as follows:

For purposes of comparison an exposure test was made of a coating of the one-half second nitrocellulose with plasticizer. Another test was made with a composition containing similar nitrocellulose and dammar resin with plasticizer. The proportions of the dammar resin were two parts to one part of nitrocellulose in one sample and one part of this same resin to three parts of nitrocellulose in another sample. Previous observations had shown dammar to be more enduring than some of the natural resins such as elemi, manila, copal, and the like; hence dammar was considered to represent these natural resins fairly.

After an exposure of one month the panels carrying the coating containing the dammar resin showed noticeable deterioration. At the end of two months these coatings were completely destroyed or disintegrated to the point where they had no protecting value for the surface beneath. The coating containing the larger proportion of dammar resin had a somewhat shorter life than the other sample. In fact, the former was disintegrated about two weeks before the latter.

The coating containing only the nitrocellulose with plasticizer endured for about three months, showing that the natural resin shortened the life of the nitrocellulose.

At the end of five months the coatings made with nitrocellulose and the various resins A to H inclusive were in good condition. It should be noted that two parts of these resins were used to one part of the nitrocellulose, as set forth above.

From these and other observations the outstanding property of resins of this general character in adding longevity to nitrocellulose coatings was made apparent. Furthermore, it was found that when the proportion of such protective resin was considerably reduced the endurance of the film was not as great. However, even in the proportion of two parts of such resin to six parts of nitrocellulose, the life of the coating was about four months, as compared with a period of two months when dammar was used in like proportion.

The resins, semi resins, or resinoids, falling within the scope of the present invention are considerable in number and are of varied physical and chemical characteristics. Of these I instance as especially appropriate, resins of suitable solubility embraced in the following very diverse groups:

1. *Glyceride resins, particularly those containing two or more organic acids.*—As a rule two or more acids are more effective than a single one in obtaining the requisite solubility, low acid number and resistance to exposure.

2. *Glycol resins.*—The number of these is large as several glycols are available (e. g., ethylene or propylene glycol) and such glycols react with numerous organic acids or mixtures of organic acids to yield a multiplicity of resins of this type. The glycol resins as a rule are softer than the glyceride resins and therefore are better adapted in some cases for application where high flexibility is desired.

3. *Pentaerythritol resins.*—The substance pentaerythritol may be caused to resinify by heating with various organic acids or mixtures of such acids. In general, resins are obtained which are harder than the glyceride resins.

4. *Chlorhydrine resins.*—The several chlorhydrines, such for example as ethylene or propylene chlorhydrines, or mixtures of these resinify when heated with various organic acids. As a rule, darker resins result than those obtained according to the composition set forth in groups 1, 2 and 3.

In physical characteristics these various resins differ in hardness ranging from brittle products to those which are viscous or even thick liquids of a semi-resinous character. In color they will range from deep brown, such as that secured from the fatty acids of boiled or blown rapeseed oil, phthalic anhydride and glycerol, to very light colored products such as those obtained from castor oil, phthalic anhydride and glycerol, or from benzoic glyceride. The latter by purification may be obtained almost pure white. It should be noted moreover that benzoic glyceride is a solid which only under certain conditions has an appearance resembling resins. The solubility in nitrocellulose solvents varies and for those applications where high concentration of the resin is required, the more soluble varieties are preferably employed. The resins made from the fatty acids of vegetable oils with another organic acid, such for example as a crystalline acid and glycerol are fairly soluble in nitrol cellulose solvents. In addition, several of these, as, for example, the cottonseed oil fatty acid resin (product B given above) is soluble in, for example, a mixture of toluol and chlorobenzol. On the other hand, the product made from castor oil (product G given above) is not soluble in such a solvent mixture.

Phthalic acid, or preferably phthalic anhydride, is used advantageously in making useful resins for carrying out the present invention because this anhydride is made on a large scale by the catalytic oxidation of naphthalene and therefore is cheap and obtainable in large quantities. Hence, because of its industrial significance this acid is specified more particularly in the illustrations given herein. It should be understood, however, that such illustrative embodiment does not preclude the employment of resins made without phthalic acid or anhydride including products derived from various aliphatic acids, e. g., tartaric, lactic, succinic, citric, malic, maleic, fumaric, and the like, and higher fatty acids such as palmitic, stearic, stearolic, behenic, erucic, oleic dihydroxystearic, and other hydroxylated fatty acids including those having twelve to twenty-two carbon atoms; also acids of the aromatic series including benzoic, salicylic, phthalic, diphenic, camphoric acids, and the like, or mixtures of two or more of any of the above noted acids employed for the purpose of obtaining a resinous complex.

*Other effects of variation of proportion of the resin*

Cottonseed phthalic glyceride resin was dissolved in a mixture of equal volumes of secondary butyl acetate and secondary butyl alcohol to form a solution of fifty per cent strength, that is, one containing equal weights of resin and solvent. A second solution containing approximately twenty per cent of one-half second nitrocellulose was made using a similar solvent mixture. These solutions were mixed in various proportions to yield coating compositions having different percentages of resin. In the following ratios, the first figure represents the nitrocellulose and the second figure the proportion of protecting resin:

1 to 4. Hard, tough coating, smooth and glossy.

1 to 6. Hard, tough coating, smooth and of still higher gloss.

1 to 8. Firm coating, not quite as hard as the two preceding, but tough and flexible.

When placed in an oven at 50° C. these coatings did not "print", showing that the resin was sufficiently resistant to those temperatures which would be encountered under service conditions.

1 to 10. Coating somewhat softer, but with high gloss. Prints slightly at 50° C. Should be an excellent coating where elasticity and no very high degree of hardness is specified.

1 to 15. Coating has high gloss, but prints.

1 to 20. Prints more easily. The pressure of the thumb produces an imprint. Has fine lustrous surface, showing that nitrocellulose blends with the resin in all proportions and such a disproportion of resin does not cause precipitation of the nitrocellulose.

*Hardening action.*—On the other hand the nitrocellulose acts as a hardening agent for the resin. The latter, in the quality employed, was comparatively soft and gummy, the nitrocellulose had a pronounced hardening effect which was clearly perceptible even with the proportions of 1 to 15 and 1 to 20.

*Adehsion.*—Because of the feasibility of using large proportions of resin the difficulties due to lack of adhesion are overcome and the adhesive effect may be modified at will. Furthermore, the employment of these protective resins also makes possible the addition of cheap destructive resins in moderate proportion to cheapen the cost or to modify the adhesion or for any other purpose. In other words, resins having a destructive action on nitrocellulose coatings exposed to the weather may be incorporated in the composition containing the protective resin in order that the destructive resin as well as the nitrocellulose may receive protection from the protecting resin.

*Effect of pigment.*—The action of the pigment in such compositions is pronounced and has to be taken into consideration in obtaining the surface finish desired. When a pigment such as lithopone is incorporated in the ratio of four parts to one part of nitrocellulose and four parts of protective resin, such as the cottonseed resin above mentioned, and a solution thereof is applied to a surface, the coating on drying will be found to have a flat or "eggshell" effect. Such a flat surface reflecting light only slightly and producing a soft rather velvety finish, owing to its artistic quality is well suited for employment on walls and trim of house, for furniture, and the like. As an exterior point for houses, boats, automobiles, and the like, a glossy lustrous surface frequently is required. Increase in the proportion of resin to nitrocellulose increases the gloss, while the addition of pigment greatly detracts from the gloss. The addition of solid pigment well ground with the composition so that a part of said pigment is in a condition approaching colloidal dispersion gives the coating greater hardness and firmness and in that respect cooperates with the nitrocellulose in its action on the protective resin. Thus, a composition in the ratio of one part of nitrocellulose to ten parts of the protective resin yielding a coating which is on the verge of showing printing effects is hardened by the incorporation as aforesaid of a finely-divided pigment. By increasing or decreasing the proportion of the pigment various hardening effects are secured with a given mixture of the nitrocellulose and protective resin. The pigment may be ground in a solution of nitrocellulose, or in a solution of the protective resin, or in a solution containing both the nitrocellulose and protective resin, such grinding, as stated above, preferably being thorough in order to convert a portion at least of the pigment into a state approaching a condition of partial dispersion.

*Low boiling point solvents.*—By employing a high content of protective resin there appears to be less tendency for the nitrocellulose to blush. In fact, with sufficient resin present blushing is entirely overcome in many cases allowing of the use of acetone or other cheap solvents at least in part in place of the more costly high boiling solvents generally used as water eliminators. Mixtures of ethyl acetate or isopropyl acetate with ethyl or propyl alcohols thus sometimes may be employed in the vehicle for the coating solids. Various aromatic hydrocarbons and halogenated hydrocarbons may be employed as diluents advantageously.

*Brushing qualities.*—In a general way the brushing qualities, that is, the freedom of working under the brush and the ability to spread the coating by means of a brush without leaving brush marks will be found to increase as the proportion of nitrocellulose is lowered. Reduction in the proportion of nitrocellulose, especially when the latter is of high or medium viscosity causes a corresponding reduction in the viscosity of the solution and results in improved brushing qualities. This reduction in the proportion of nitrocellulose makes possible the employment to better advantage of various solvents of relatively low boiling point and as these are less costly than most of the solvents of higher boiling point, there results a cheapening in the cost of the composition.

*Gloss producing effect of plasticizer.*—In coating compositions having a fairly high content of protective resin, the result of the addition of a small proportion of substances such as dibutyl, phthalate, tricresyl phosphate, and the like, known as plasticizers, is a remarkable effect on the surface finish. As stated above, when a composition in the ratio of nitrocellulose 1, protective resin 4, and pigment 4, forms a coating from solution, the surface of that coating is flat or of egg-shell finish. The addition of only a small amount of plasticizer yields a high gloss. This is illustrated by the following:

|  | Parts by Weight | |
| --- | --- | --- |
|  | A | B |
| Lithopone | 20 | 20 |
| Cottonseed phthalic glyceride resin | 20 | 20 |
| ½ second nitrocellulose | 5 | 5 |
| Solvent | 70 | 70 |
| Plasticizer mixture of equal parts dibutyl phthalate and blown castor oil | None | 1 |

The composition A yields a dull or matt finish, while the composition B exhibits a glossy, lustrous finish. In view of the small amount of plasticizer added this effect is noteworthy. Such a step makes possible the production of a hard, glossy, but flexible coating relatively resistant to exterior exposure and suitable for finishing automobiles, boats, and the like. The rubbing, polishing and waxing operations necessary to produce a glossy surface from coatings drying with a flat finish are thus avoided.

Attention is called to the curious interrelation between nitrocellulose, protective resin, pigment and plasticizer. The coating A without the pigment is glossy, with the pigment it is flat and with the plasticizer it again becomes glossy.

*Brushing lacquer for household use.*—A composition which illustrates in a detailed way the preparation of a pigmented lacquer for household use is the following:

58 lbs. cottonseed phthalic glyceride resin were dissolved in an equal weight of a mixture composed of equal parts secondary butyl acetate and secondary butyl alcohol. 28.6 lbs. of commercial ½ second viscosity nitrocellulose containing about 20 lbs. of actual nitrocellulose and 8.6 lbs. of denatured alcohol were dissolved in a mixture composed of 35.7 lbs. each of secondary butyl acetate and secondary butyl alcohol, thus forming a solution containing twenty per cent of nitrocellulose. A white pigmented stock was prepared by grinding equal weights of lithopone and the resin solution. 40 lbs. of this pigment stock was admixed with an additional 20 lbs. of the resin solution and 25 lbs. of the nitrocellulose solution. 15 lbs. each of secondary butyl acetate and secondary butyl alcohol were added. From this composition various tints may be obtained by adding small amounts of appropriate pigments which previously have been ground with the resin solution.

A coating composition of this character may be applied directly over varnish finish without any deleterious softening action. On the other hand the coating adheres well to such old finish and therefore furniture which requires repainting may be coated advantageously with this composition. Usually two coats are required to give a uniform smooth eggshell effect. The composition dries quite rapidly, being dust-free in ten minutes or thereabouts and the second coat may be applied in a period of say thirty minutes. On the other hand, although drying rather rapidly, the composition under the brush works freely and does not appear to set and become sticky as gradually and progressively as would be expected, but rather tends to hold its fluidity for a period which extends quite close to the time when setting or drying occurs to a condition where the coating seems dry to the touch.

The addition of a small amount of plasticizer to the foregoing composition provides a glossy finish.

*Additions.*—So far as additions of foreign substances do not destroy the desired characteristics of the present invention, I may add, as desired, such substances in varying proportions and under varying conditions. For example, I may, as indicated above, make additions of natural resins such as rosin, dammar, or other products of a resinous character, oils and substances such as camphor, camphor substitutes, pearl essence, dyes, and the like. Insofar as the composition contains the preferred cellulose compound, namely; nitrocellulose, I make use of the usual solvents for nitrocellulose, but as diluents in the case of the oil phthalic resins mentioned, prefer not to employ hydrocarbons of petroleum, at least in any large proportion. Toluol and solvent naphtha are preferable for the purpose, likewise, benzol when its volatility is not objectionable. Monochlor-benzol is an excellent diluent in the nitrocellulose-protective resin composition as it has a good solvent action for the last mentioned type of resin.

While I have mentioned the possibility of additions of natural resins such as rosin or dammar, I prefer not to use these, not to employ, at least in any great proportion, such resins modified by chemical treatment. Rosin, in particular, is a resin of a highly destructive type and even though modified by treatment with glycerol to make rosin ester or ester gum, and even when further modified by combining with both phthalic anhydride and glycerol to make a resinous complex, the effect of the rosin is observed to carry through, giving coatings which may be quite satisfactory for interior use, but which are much less effective than the various protective resins enumerated herein when the coating is to receive exterior exposure or to be subjected otherwise to severe service conditions. Accordingly, in carrying out the invention in its preferred form I desire to keep to a minimum any additions of natural resins which may be required for fluxing purposes in making the protective material. Phthalic glyceride resin polymerizes quite readily when undergoing heat treatment, and while the fatty-oil-acids noted above are helpful in preventing polymerization while resinification is progressing, it is sometimes desirable to add a very small amount of rosin, for example, to serve as a flux and to assist in preventing polymerization while resinification is being conducted to yield a product of low acid number. If polymerization sets in an insoluble resin may result and in fact, the entire contents of the varnish kettle may solidify without warning during the heat treatment unless considerable care is observed.

*Pigments.*—In general, I prefer to use strong or concentrated pigments such as lakes, organic colors, Prussian blue, chrome yellow, chrome green, and fine grades of gas black, and the like. Bulky pigments such as ochre, umber, iron oxide red, and similar bulky pigments, while not precluded, are not recommended, and if used should best be thoroughly ground with the other components of the coating. In making white color lithopone is a pigment which settles somewhat more readily than zinc oxide and therefore preferably should be ground more thoroughly. Titanium oxide or titanox although a strong pigment is more likely to permit of the generation of acid in the coating due to alteration in the nitrocellulose on exposure to sunlight. However, urea or other appropriate antacids may be incorporated when desired to serve as a corrective substance.

*Acid number.*—Natural resins vary greatly in acidity and even the same kind of resin varies more or less in acid number depending on the location from which it is gathered, etc. Resins of high acid number, as a rule, are objectionable for use with nitrocellulose because the acid tends to impair the stability of the latter. By employing synthetic resins it is possible to obtain products of uniform acid number, and moreover, to reduce the acid number to a fairly low degree. In general, I prefer to have the acid number of the protective resin below 30, or better, in the neighborhood of 20, or even lower than that figure. The protective effect appears to be enhanced by keeping the acid number low.

Furthermore, as stated in Serial No. 609,134 I may make, for example, phthalate resins containing a base in combination, as, for example, the oxide of calcium, magnesium or zinc. Thus, phthalic anhydride and glycerol, or other hydroxylated substance may be caused to combine in part and the acid number reduced by heating with a basic substance such as hydrated lime, magnesium oxide, or zinc oxide, until any free resin acid or free organic acid other than the acid actually combined in the resin, or that portion of it which is combined, is neutralized. In this manner I may obtain a calcium phthalate resin, a zinc phthalate resin, a magnesium phthalate resin, or other similar product.

*Films.*—The coating composition may be applied to a surface from which, when dry, the resulting film may be easily detached, e. g., a clear amalgamated metallic surface. In this manner films containing the protective resin and having various characteristics may be obtained. The film may be formed from a single coat or from a plurality of coats, with or without pigment, plasticizer, and the like.

*Very low nitrocellulose content.*—As noted above, when nitrocellulose and the protective resin (cottonseed glyceride resin) were used in the ratio 1:15, or 1:20, clear smooth films were produced. These were somewhat soft as indicated. Gardner (Paint Manufacturers Association Bulletin) has pointed out that nitrocellulose with a considerable proportion of natural resin yields a very pronounced checked or alligatored coating. The ability to blend in any portion with the protective resin of the present invention enables very low proportions of nitrocellulose to be employed. In order to reduce printing when such larger proportions are used the pigment may be considerably increased in amount and this will result in a moderate hardening effect which frequently suffices. The coating usually possesses a good gloss due to the high percentage of resin despite the amount of pigment present.

If nitrocellulose is omitted entirely it is possible to use the solution of, for example, cottonseed phthalic glyceride resin, associated with a relatively considerable proportion of pigment and obtain a coating which dries quickly. Its slightly yielding character adapts it for making roofing materials or coating roofs, painting galvanized iron, metallic shingles, and the like.

An advantage in employing a high proportion of the protective resin is that in cold weather the film is less brittle than is the case when low percentages of the resin are employed. When sheet metal panels coated with nitrocellulose and varying quantities of the protective resin were chilled by placing on ice and then were suddenly bent, it was found that those compositions containing from 10 to 20 parts of the resin to 1 part of the nitrocellulose showed little or no tendency to crack.

*Cellulose acetate.*—The acetone-soluble cellulose acetate may be employed with benzoic phthalic glyceride resin or other benzoic resins. A film formed from cellulose acetate with a resin of this character is less combustible than one made in a corresponding manner from nitrocellulose. Mixtures of nitrocellulose and acetyl cellulose may be employed in some cases.

*Nitrocellulose of a viscosity lower than one-half second.*—By treating nitrocellulose, for example, that having one-half second viscosity, with chemical agents, or by exposure to heat, the viscosity is reduced further and in fact, may be reduced to a viscosity in the neighborhood of that of the resin solution itself. Such treated or depolymerized or hydroxylated nitrocellulose has poor endurance, but may be fortified with the protective resin.

As an illustration a solution of one-half second nitrocellulose was treated with ammonia gas, precipitated, washed thoroughly and dried. The product was white in color and was soluble in absolute alcohol. It yielded clear films of good color which were somewhat weaker than those obtained from the original one-half second nitrocellulose. As the viscosity of nitrocellulose was so low that it could not be determined readily in the solvent mixture employed in making the determination by means of which the original nitrocellulose was graded as one-half second, a different solvent was used and a higher concentration. For this purpose a 20 per cent solution of the modified nitrocellulose was made in a mixture of equal volumes secondary butyl acetate and secondary butyl alcohol. A solution of similar strength was made using the original one-half second nitrocellulose. Under these conditions the one-half second nitrocellulose showed a viscosity of ten seconds. The nitrocellulose which had been treated with ammonia showed a viscosity of one-fourth of a second. In other words, the treatment had changed the viscosity relatively speaking from 40 to 1. A 20 per cent solution of cottonseed phthalic glyceride resin in the same solvent mixture showed a viscosity of 0.2 or approximately the viscosity of the ammonia-treated nitrocellulose. In other words, the treatment had reduced the nitrocellulose to a viscosity closely resembling that of the protective resin solution of like strength.

A composition made by mixing 20 parts by weight of the original one-half second nitrocellulose, 100 parts of the same resin and 180 parts of the same solvent mixture, affording a content of solids of 40 per cent showed a viscosity under like conditions of 6.5 seconds.

20 parts of the ammonia-treated nitrocellulose, 100 parts of the same resin and 180 parts of the solvent, total solids 40 per cent, showed a relative viscosity of 1. It should be noted that under like conditions using the one-half second nitrocellulose the viscosity was 6.5.

*High viscosity nitrocellulose.*—Although described with reference to low viscosity nitrocellulose, including depolymerized or somewhat denitrated nitrocellulose, the employment of the protective resin with nitrocellulose of high viscosity is not precluded. Likewise, it is possible to employ a mixture of high viscosity and low viscosity nitrocellulose.

What I claim is:

1. A composition comprising nitrocellulose of low viscosity and a fatty-oil-acid phthalic glyceride resins.

2. A composition comprising nitrocellulose and cottonseed-oil-acid phthalic glyceride resin.

3. A composition comprising nitrocellulose of low viscosity and a phthalic glyceride resin that yields a fatty acid upon hydrolysis.

4. A composition comprising a film-forming cellulose derivative and cotton-seed oil acid phthalic glyceride resin.

5. A coating composition containing a film-forming cellulose derivative and a phthalic glyceride resin, the phthalic glyceride resin being modified by an inorganic base.

6. A coating composition containing a film-forming cellulose derivative and a phthalic glyceride resin that yields a fatty acid upon hydrolysis, the phthalic glyceride resin being modified by an inorganic base.

7. A coating composition containing a film-forming cellulose derivative, a phthalic glyceride resin that yields a fatty acid upon hydrolysis, the cellulose derivative and resin being in solution in a solvent vehicle, the cellulose derivative and resin constituting more than 30% of the composition.

8. A coating composition containing a film-forming cellulose derivative, and a phthalic glyceride resin that yields a fatty acid upon hydrolysis, in solution in a solvent vehicle, the composition containing more than 30% of solids.

CARLETON ELLIS.